United States Patent
Smith

(10) Patent No.: US 9,680,374 B2
(45) Date of Patent: Jun. 13, 2017

(54) DC TO DC BOOST CONVERTER UTILIZING STORAGE CAPACITORS CHARGED BY PARALLEL INDUCTOR

(71) Applicant: Marcus Allen Smith, Temple Hills, MD (US)

(72) Inventor: Marcus Allen Smith, Temple Hills, MD (US)

( * ) Notice: Subject to any disclaimer, the term of this patent is extended or adjusted under 35 U.S.C. 154(b) by 36 days.

(21) Appl. No.: 14/721,349

(22) Filed: May 26, 2015

(65) Prior Publication Data
US 2015/0349641 A1  Dec. 3, 2015

Related U.S. Application Data

(60) Provisional application No. 62/003,049, filed on May 27, 2014.

(51) Int. Cl.
| | |
|---|---|
| *H02M 3/158* | (2006.01) |
| *H02M 3/07* | (2006.01) |
| *H02M 1/14* | (2006.01) |
| *H02M 3/156* | (2006.01) |
| *H02M 1/32* | (2007.01) |

(52) U.S. Cl.
CPC ............... *H02M 3/07* (2013.01); *H02M 1/14* (2013.01); *H02M 1/32* (2013.01); *H02M 3/156* (2013.01); *H02M 3/1584* (2013.01)

(58) Field of Classification Search
CPC ........ H02M 3/156–3/1588; H02M 2001/0096; H02M 1/14–1/15; H02M 3/06–3/07
See application file for complete search history.

(56) References Cited

U.S. PATENT DOCUMENTS

| 5,146,398 A | * | 9/1992 | Vila-Masot | ......... | H02M 1/4208 |
| | | | | | 323/222 |
| 5,165,049 A | * | 11/1992 | Rotman | ................ | F27B 14/061 |
| | | | | | 219/664 |

(Continued)

OTHER PUBLICATIONS

Jih-Sheng Lai et al. "Multilevel Converters—A New Breed of Power Converters" IEEE Transactions on Industry Applications, [1996], vol. 32, No. 3, pp. 509-517.

(Continued)

*Primary Examiner* — Harry Behm
*Assistant Examiner* — Peter Novak
(74) *Attorney, Agent, or Firm* — Millen White Zelano & Branigan, P.C.

(57) ABSTRACT

A high frequency inductive emf circuit charges storage capacitors, one at a time, from a DC source to a voltage that is higher than the DC output voltage. After each storage capacitor is charged, it is disconnected from the charging circuit and then connected to an output device/regulator that uses the energy in each storage capacitor to provide the desired DC output voltage to a load. While one storage capacitor is being charged, a previously charged storage capacitor is being discharged through an output device/regulator. After being discharged, each storage capacitor is disconnected from its output device/regulator and reconnected to the charging circuit and is charged again. While being charged, the storage capacitors are in a parallel circuit to the inductor in the charging circuit. The inductor in the charging circuit and the DC source are never in a current loop with the load.

18 Claims, 8 Drawing Sheets

(56) References Cited

U.S. PATENT DOCUMENTS

| | | | |
|---|---|---|---|
| 5,821,701 A | 10/1998 | Teggatz et al. | |
| 6,075,295 A | 6/2000 | Li | |
| 6,326,774 B1 * | 12/2001 | Mueller | H02M 3/1588 323/222 |
| 6,429,632 B1 | 8/2002 | Forbes et al. | |
| 6,469,482 B1 | 10/2002 | Jahanshir et al. | |
| 6,563,269 B2 | 5/2003 | Robinett et al. | |
| 6,744,643 B2 | 6/2004 | Luo et al. | |
| 6,744,669 B2 | 6/2004 | Jahanshir et al. | |
| 7,034,601 B2 | 4/2006 | Carmina et al. | |
| 7,049,793 B2 | 5/2006 | Itoh et al. | |
| 7,417,488 B2 | 8/2008 | Ahmed et al. | |
| 8,259,476 B2 | 9/2012 | Ben-Yaakov et al. | |
| 8,686,667 B2 | 4/2014 | Mishima et al. | |
| 8,823,342 B2 | 9/2014 | Williams | |
| 2002/0067143 A1 | 6/2002 | Robinett et al. | |
| 2003/0006742 A1 | 1/2003 | Jahanshir et al. | |
| 2003/0234581 A1 * | 12/2003 | Gabriel | H02M 1/12 307/115 |
| 2004/0036451 A1 | 2/2004 | Itoh et al. | |
| 2004/0047165 A1 | 3/2004 | Luo et al. | |
| 2004/0196094 A1 | 10/2004 | Carmina et al. | |
| 2005/0174098 A1 * | 8/2005 | Watanabe | H02M 3/158 323/282 |
| 2007/0103994 A1 | 5/2007 | Ahmed et al. | |
| 2009/0040794 A1 | 2/2009 | Williams | |
| 2010/0002473 A1 | 1/2010 | Williams | |
| 2010/0026264 A1 | 2/2010 | Ben-Yaakov et al. | |
| 2011/0193495 A1 | 8/2011 | Mishima et al. | |
| 2014/0210366 A1 | 7/2014 | Mehta et al. | |
| 2014/0354251 A1 | 12/2014 | Williams | |

OTHER PUBLICATIONS

Danwei Liu et al. "A ZVS Bi-Directional DC-DC Converter for Multiple Energy Storage Elements" IEEE Transactions on Power Electronics, [2006], vol. 21, No. 5, pp. 1513-1517.

* cited by examiner

DC TO DC BOOST CONVERTER UTILIZING STORAGE CAPACITORS CHARGED BY PARALLEL INDUCTOR

FIELD OF THE INVENTION

This invention relates to a system that is a direct current (DC) power source. The system provides a new and novel way for a DC source to be used to provide power a load that the DC source would not normally be able to provide power to.

BACKGROUND OF THE INVENTION

DC power sources are common in a myriad of electrical and electronic devices, machines, and vehicles. Similarly, DC power systems that use a DC power source and increase the output to a level that is higher than the DC power source, are also very common.

There are several prior art DC power systems that accomplish such increases with a DC to DC boost converter. Such boost converters use the physical inductive emf characteristics of an inductor to achieve an increase in voltage to add to the voltage of the DC source. These prior art systems use the circuit elements and circuit operation shown in FIG. 1a, 1b, and 1c. In FIG. 1a, the DC source (not shown) is connected to terminals DC IN+ and DC IN−. Switch S is closed and an electrical current flows in the current loop made by the DC source, inductor L, and switch S as shown by the arrow. The voltage polarity across the inductor is opposite to that of the DC source.

When switch S is opened quickly, the physical inductive emf characteristics of the inductor cause it to immediately reverse polarity as shown in FIG. 1b, in an attempt to keep the current established in FIG. 1a, flowing in the same direction. This inductive emf across the inductor adds to the DC source voltage. Diode D becomes forward biased and an output voltage is supplied to the load which is equal to the inductive emf plus the DC source voltage (minus the forward voltage of the diode D). A current loop is formed between the DC source, inductor L, diode D, the LOAD, ground, and back to the DC source. Capacitor C is also charged to this output voltage.

After a programmed amount of time, control circuitry in these prior art systems closes switch S again to reestablish the current in inductor L as shown in FIG. 1c. Once again, an electrical current flows in the current loop made by the DC source, inductor L, and switch S. The voltage polarity across inductor L is once again opposite to that of the DC source. Capacitor C supplies power to the LOAD during this time so that the output voltage remains nearly constant to minimize output voltage ripple.

In these prior art systems, control circuitry typically opens and closes switch S at a high frequency. Therefore, the continuous operation of such DC to DC boost converters is a rapid back and forth between FIG. 1a and FIG. 1b.

The present invention improves on prior art DC to DC boost converters by limiting the role of the DC source and inductive emf charging circuit to only charging storage capacitors. The DC source may also be used to provide power to control circuitry. The storage capacitors are charged to a voltage that is above the intended output voltage. Contrary to this, in prior art boost converters, the output voltage is the sum of the DC source voltage and inductor emf, and the output capacitor is charged to this voltage. These storage capacitors are then used to provide power to a load. At no time is the inductor in the inductive emf circuit in a current loop with the load. Also, at no time is the DC voltage source in a current loop with the load.

SUMMARY OF THE INVENTION

The DC power source is used to establish a current in the inductor in the inductive emf circuit. This inductor current is then reduced or "turned off" quickly to produce an emf in the inductor. This emf places a small amount of electrical charge on a first storage capacitor. This first storage capacitor is in a circuit that is parallel to the inductor. This cycle is repeated several times at high frequency to quickly place more and more electrical charge on the first storage capacitor. The first storage capacitor is charged to voltage that is greater than the output voltage. Once the control circuitry (controller) detects that the first storage capacitor has been charged to a predetermined value, the controller stops the charging process and opens a switch to disconnect the positive terminal of the first storage capacitor from the inductor. The controller then turns on the first output device/regulator connected to the first capacitor so that the electrical energy in the first storage capacitor is used to provide the desired output voltage. An output device/regulator is a transistor, silicon-controlled rectifier, thyristor, triode, or any other similarly functioning device and may be accompanied by a zener diode and/or any electrical component or circuit that functions to maintain, to the maximum degree possible, a specific voltage output that is applied to the load.

While the first storage capacitor is being discharged to provide power to the load, another switch is closed to connect the second storage capacitor to the inductor. The second storage capacitor is then charged to a voltage greater than the output voltage like the first storage capacitor was charged. Once the controller detects that the second storage capacitor has been charged to a programmed voltage, the controller stops the charging process and opens a switch to disconnect the positive terminal of the second storage capacitor from the inductor.

When the first storage capacitor is discharged to a programmed voltage, the controller turns the first output device/regulator off. The controller then turns on the second output device/regulator which is connected to the second storage capacitor so that the electrical energy in the second capacitor is used to provide the desired output voltage.

While the second storage capacitor is being discharged to provide power to the load, the switch that connected the first storage capacitor to the inductor is closed again by the controller. The first storage capacitor is again charged to a voltage greater than the output voltage. Once the controller detects that the first storage capacitor has again been charged to a programmed voltage, the controller stops the charging process again and opens the switch again to disconnect the positive terminal of the first storage capacitor from the inductor as before. The process continues and could involve more than two storage capacitors and more than two output devices/regulators.

In some embodiments the direct current (DC) power source system includes:

a controller wherein said controller is configured to control the current flow and electric charge through the system;

an electromotive force (emf) switch wherein said emf switch is configured to receive current from a DC voltage source and provide repeating and intermittent current to an inductor;

the inductor wherein the inductor is configured to receive repeating and intermittent current from the emf switch and provide electric charge to at least two storage capacitors;

the at least two storage capacitors configured to receive electric charge from the inductor and provide current to a load;

at least two charging switches wherein said charging switches are provided between said at least two storage capacitors and said inductor, wherein said charging switches are connected to said controller and configured to be controlled by said controller and wherein said charging switches are configured to allow for the charging of said at least two storage capacitors, at least two output devices provided between said load and said at least two storage capacitors wherein said at least two output devices are connected to said controller and configured to being controlled by said controller, and wherein said at least two output devices are configured to allow the discharge of current from the at least two storage capacitors to said load; and wherein the system is configured to provide current from one of the at least two storage capacitors to a load while simultaneously charging at least one of the other at least two storage capacitors.

In some embodiments the system additionally includes:
an output capacitor wherein the output capacitor is provided between the at least two output devices and the load and is configured in parallel with the load, and
wherein the output capacitor is configured to provide power to the load while the system switches between providing current from each of the at least two storage capacitors.

In some embodiments said at least two storage capacitors are charged to a voltage which is greater than the DC output voltage applied to the load.

In some embodiments the system additionally includes:
a voltage measuring circuit positioned across terminals of at least one of the at least two storage capacitors, wherein said voltage measuring circuit is configured to measure voltage and communicate said voltage measurement to said controller.

In some embodiments the system additionally includes:
at least one diode between the inductor and said at least two storage capacitors and in series with said at least two storage capacitors, wherein said at least one diode is configured to provide circuit isolation for the at least two storage capacitors and prevent the at least two storage capacitors from discharging while they are being charged.

In some embodiments the storage capacitors, charging switches, and output devices of the system are associated with each other in a 1:1:1 ratio.

In some embodiments only one of said charging switches is ever provided in a condition to allow its respective storage capacitor to charge.

In some embodiments the only one of said output devices is ever provided in a condition to allow its respective storage capacitor to discharge.

In some embodiments include a method of providing power to a load including:
providing electrical current from a direct current (DC) voltage source to a first storage capacitor;
charging said first storage capacitor to a predetermined value;
providing electrical current from said first storage capacitor to said load while simultaneously charging at least one second storage capacitor.

In some embodiments additionally include:
switching from providing electrical current from said first storage capacitor to providing electrical current from said at least one second storage capacitor when said at least one second storage capacitor has been charged to a predetermined value and simultaneously charging said first storage capacitor.

In some embodiments said at least one second storage capacitor comprises two second storage capacitors and wherein the second of said second storage capacitors is charged only when the first storage capacitor is being discharged and the first of said two second storage capacitors has already been charged to the predetermined value.

In some embodiments while switching from providing electrical current from said first storage capacitor to providing electrical current from said at least one second storage capacitor or vice versa, an output capacitor provides electrical current to the load.

Some embodiments additionally include controlling the switching between storage capacitors by a controller.

Some embodiments additionally include:
providing circuit isolation for the first storage capacitor and the at least one second storage capacitor and preventing the first storage capacitor and the at least one second storage capacitor from discharging while they are being charged.

Some embodiments additionally include:
determining a voltage measurement on the first storage capacitor and the at least one second storage capacitor and communicating said voltage measurements to a controller.

Some embodiments additionally include:
controlling the discharge of electrical current from said first storage capacitor and said at least one second storage capacitor to said load with at least two output devices.

In some embodiments the electrical current provided to a first storage capacitor is provided by an emf switch to repeatedly allow current from the DC voltage source to flow through an inductor and repeatedly and intermittently to produce an inductive electromotive force on the inductor of the same polarity of the DC voltage source, wherein the inductor has a polarity and magnitude that causes an electric charge to be repeatedly be placed on said first storage capacitor.

In some embodiments the inductor is in a parallel circuit with the first storage capacitor and said at least one second storage capacitor where at least one diode is in series with said at least two storage capacitors, wherein said at least one diode is configured to provide circuit isolation for the at least two storage capacitors and prevent the at least two storage capacitors from discharging while they are being charged.

In some embodiments the predetermined value is a voltage that is higher than the DC output voltage.

In some embodiments, the system is configured to prevent the DC voltage source or the inductor from ever being in a current loop with the load.

BRIEF DESCRIPTION OF THE DRAWINGS

Having briefly described the invention, the same will become better understood from the appended drawings in which.

DETAILED DESCRIPTION OF THE INVENTION

The operation and features of the present invention will be understood when considered in conjunction with the accompanying drawings.

Figure 1A:
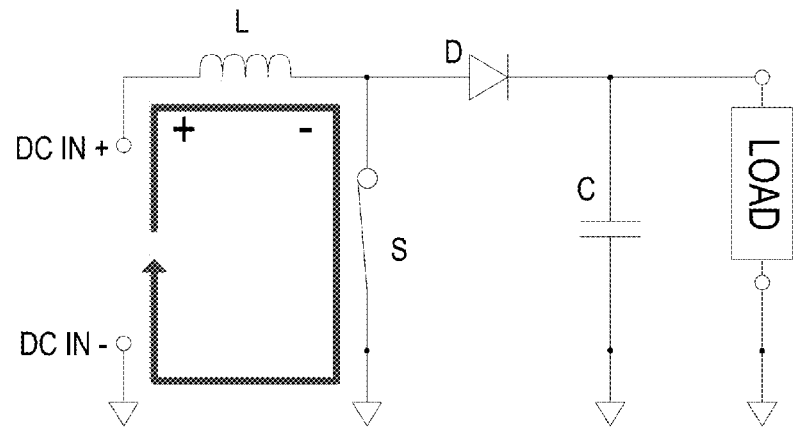
FIG. 1A is an electrical schematic of prior art DC to DC boost converters.
Figure 1B:
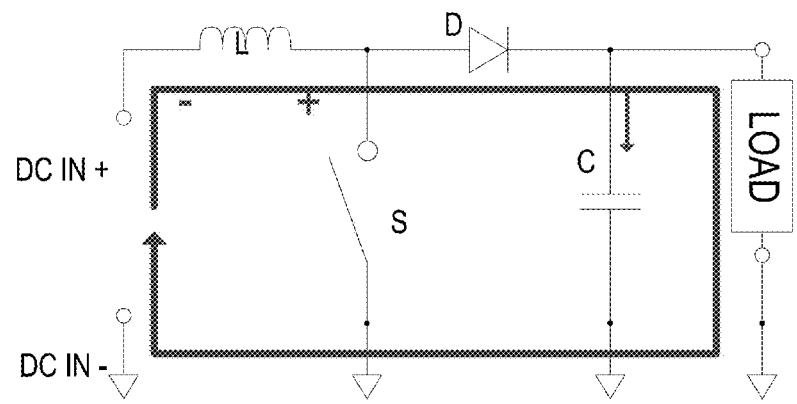
FIG. 1B is an electrical schematic of prior art DC to DC boost converters.
Figure 1C:
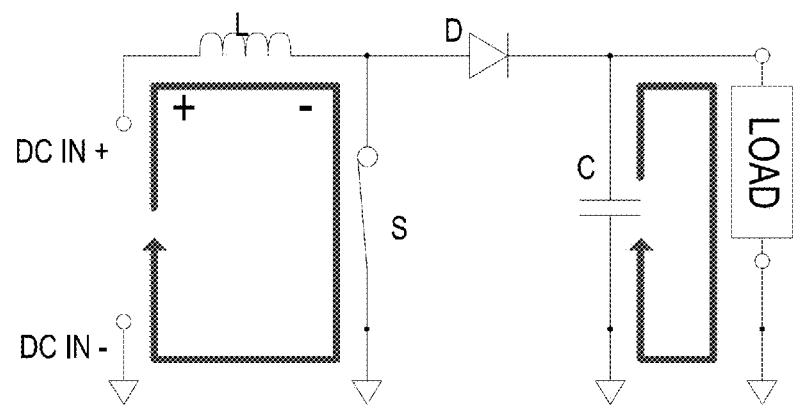
FIG. 1C is an electrical schematic of prior art DC to DC boost converters.
Figure 2:
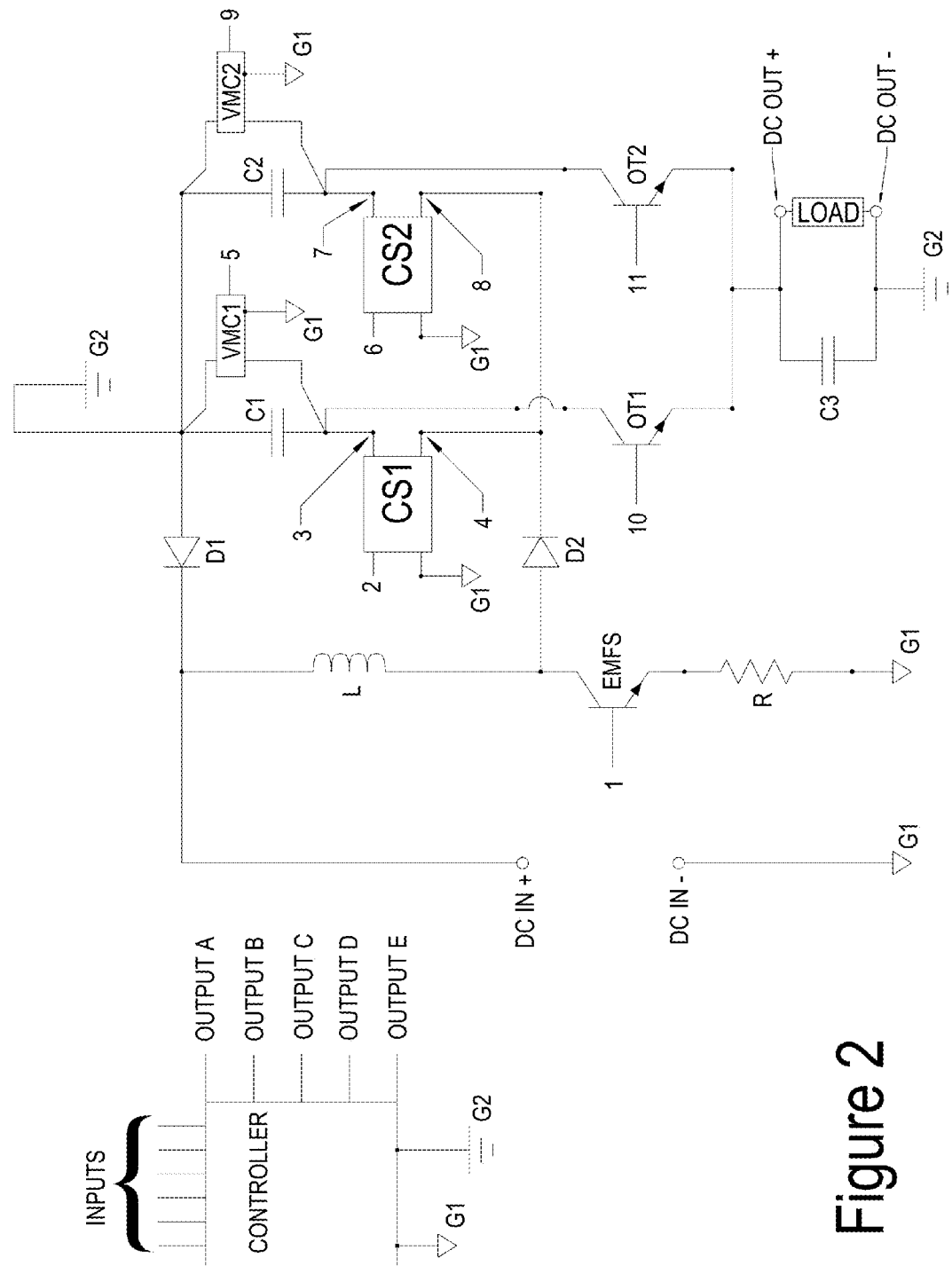
FIG. 2 is an electrical schematic of the system of the invention.

In FIG. 2, the positive terminal of a direct current (DC) voltage source that supplies power to the invention is connected to terminal DC IN+, and the negative terminal of this DC voltage source is connected to terminal DC IN−.

Output A of the CONTROLLER is connected to control voltage input terminal 2 on charging switch CS1. A charging switch can be a relay, a switch, an optoelectronic device, transistor, a triode, or any other similarly functioning device. The CONTROLLER places the necessary control voltage on terminal 2 to close the normally open output terminals 3 and 4 of charging switch CS1.

Output B of the CONTROLLER is connected to control voltage input terminal 6 on charging switch CS2. The CONTROLLER removes control voltage from terminal 6 thereby opening the normally open output terminals 7 and 8 of charging switch CS2.

Output C of the CONTROLLER is connected through a signal interface to base or gate terminal 10 of output transistor OT1. The CONTROLLER places the necessary voltage on base or gate terminal 10 to turn off output transistor OT1.

Output D of the CONTROLLER is connected through a signal interface to base or gate terminal 11 of output transistor OT2. The CONTROLLER places the necessary voltage on base or gate terminal 11 to turn off output transistor OT2.

Output E of the CONTROLLER is connected to base or gate terminal 1 of electromotive force (emf) switch EMFS. Electromotive (emf) force switch can be a transistor, switch, triode, or any similarly functioning device. Output E is used to place a repeating voltage waveform, such as a sawtooth waveform, on terminal 1. The positive slope of this waveform turns on emf switch EMFS and causes a current to flow from the DC voltage source that supplies power to the invention, through inductor L, through the collector/drain and emitter/source of emf switch EMFS, through resistor R, and ground G1 as shown by the arrow in FIG. 3. The negative slope of this waveform reduces this current such that an inductor voltage equal in magnitude to $L(di/dt)$ appears across inductor L due to the physical properties of an inductor that cause it to resist changes in current.

The voltage of inductor L has a polarity and magnitude that causes an electric charge to be placed on storage capacitor C1. The electrical charging energy and current flows from inductor L in a counter-clockwise direction from inductor L, through diode D2, through terminals 4 and 3 of charging switch CS1, into storage capacitor C1, through diode D1, and back to inductor L as shown by the arrow in FIG. 4.

As the waveform from Output E is repeated at high frequency, more and more electric charge is placed on storage capacitor C1, causing the voltage of storage capacitor C1 to continually increase. Therefore, more and more electric charge is placed on storage capacitor C1 as the high frequency waveform from Output E causes a rapid back and forth between the circuit states shown in FIG. 3 and FIG. 4. The CONTROLLER is able to measure the voltage on storage capacitor C1 through voltage measuring circuit VMC1 which provides input to the CONTROLLER through terminal(s) 5.

When the CONTROLLER senses that storage capacitor C1 has reached a programmed voltage, the CONTROLLER places the necessary voltage signal on output E to turn off emf switch EMFS. The CONTROLLER also removes the control voltage from terminal 2 on charging switch CS1 causing output terminals 3 and 4 to open. After removing control voltage from terminal 2, the CONTROLLER places a programmed voltage, through output C, on terminal 10 to cause output transistor OT1 to place a specific voltage on the DC OUT+ terminal. The LOAD connected to terminals DC OUT+ and DC OUT− causes a current to flow from storage capacitor C1, through output transistor OT1, through terminal DC OUT+, through the load, through terminal DC OUT−, into ground G2, and back to storage capacitor C1 as shown by the arrow in FIG. 5. This electric current flow causes storage capacitor C1 to continually lose electric charge, which continually reduces the voltage on storage capacitor C1 as it loses electric charge. Output capacitor C3 charges to the output voltage between terminals DC OUT+ and DC OUT−.

Figure 3:
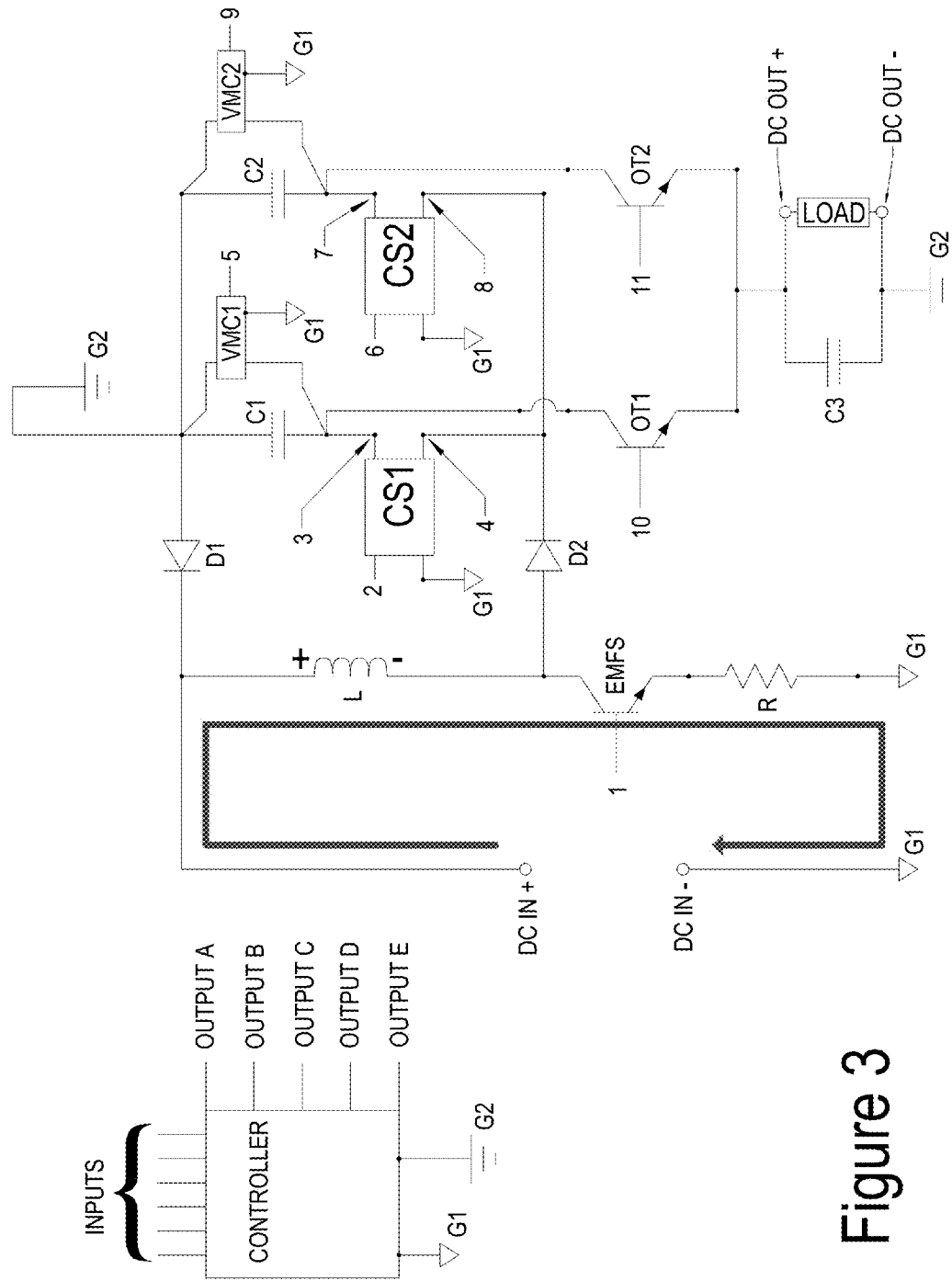
FIG. 3 is an electrical schematic of the system of the invention with an arrow showing the path of current when the DC voltage source charges the inductor.
Figure 5:
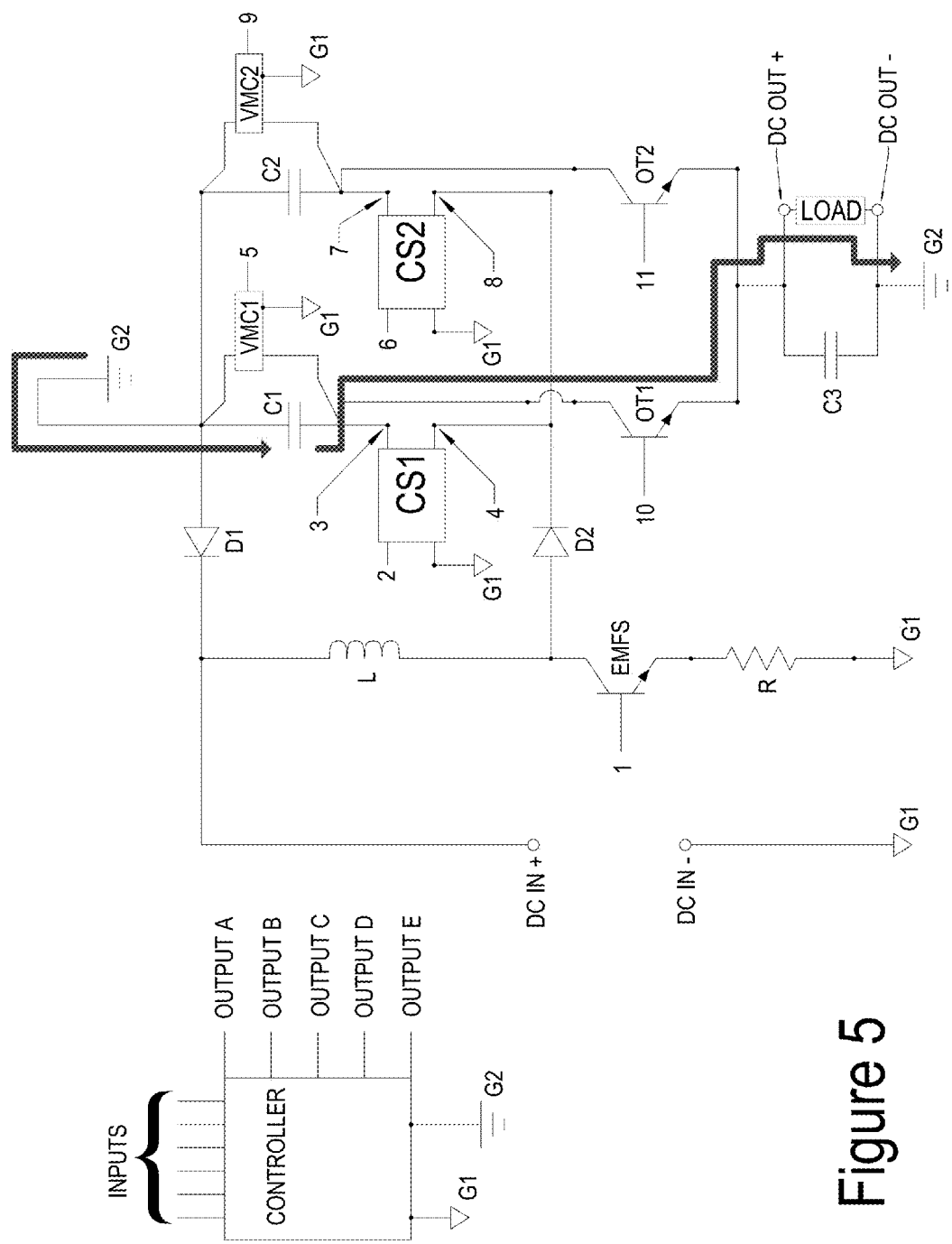
FIG. 5 is an electrical schematic of the system of the invention with an arrow showing the path of current when the first storage capacitor is providing power to the load.
Figure 6:
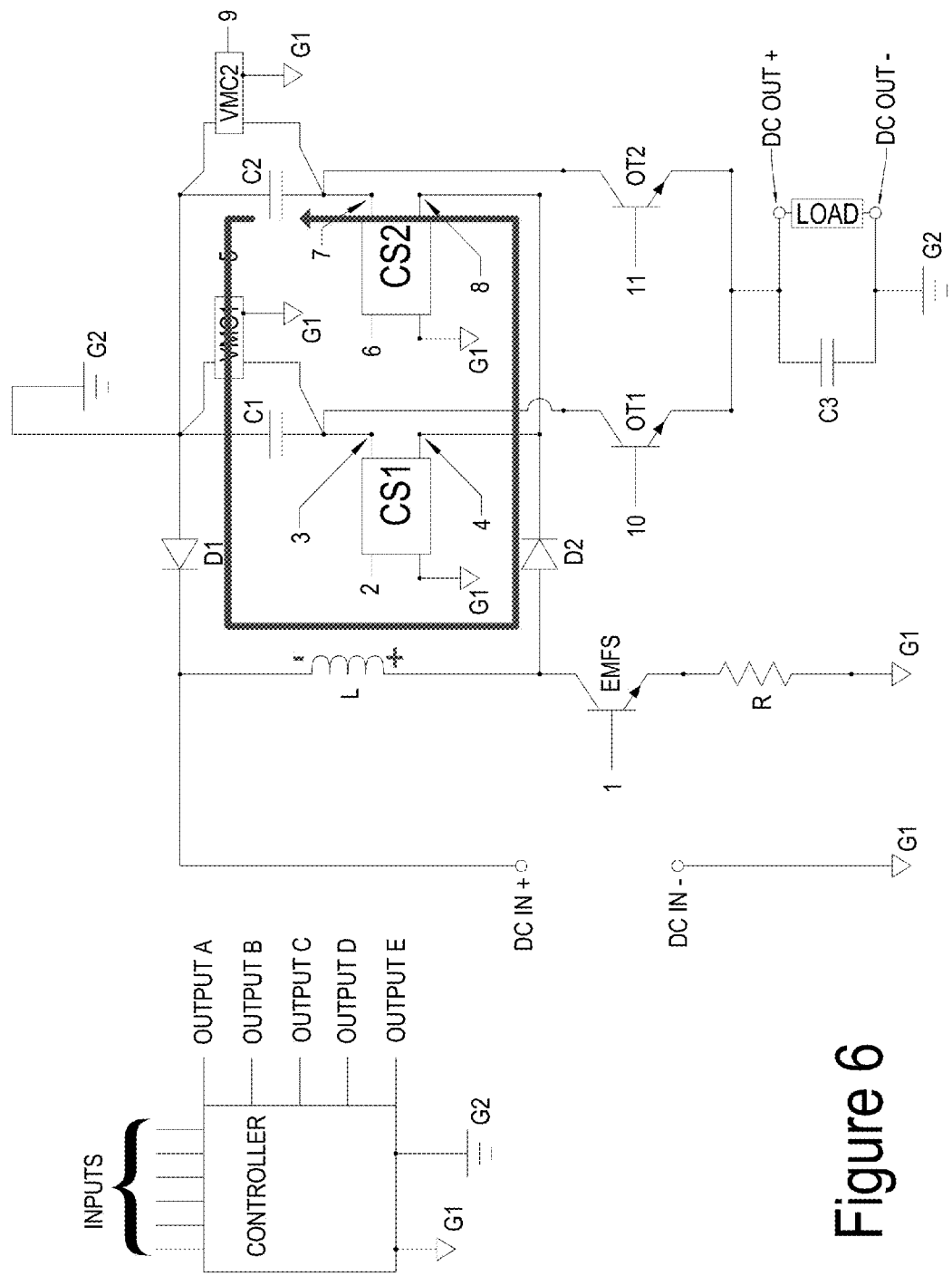
FIG. 6 is an electrical schematic of the system of the invention with an arrow showing the path of current when the inductor places electrical charge onto the second storage capacitor.

After the CONTROLLER removes control voltage from terminal 2, the CONTROLLER places control voltage on terminal 6 which causes output terminals 7 and 8 to close charging switch CS2. Output E is used by the CONTROLLER to place the same repeating voltage waveform on terminal 1 of emf switch EMFS, as was described earlier. This causes storage capacitor C2 to be charged in the same manner as storage capacitor C1 was charged as shown by the arrows in FIG. 3 and FIG. 6. Storage capacitor C2 is being charged, as shown in FIG. 3 and FIG. 6, at the same time storage capacitor C1 is supplying power to the LOAD, as shown in FIG. 5.

When the CONTROLLER senses, through voltage measuring circuit VMC2 and terminal(s) 9, that storage capacitor C2 has been charged to the same programmed voltage that C1 was charged to, the CONTROLLER places the necessary voltage signal on output E to turn off emf switch EMFS. The CONTROLLER also turns off the control voltage to terminal 6 on charging switch CS2 causing output terminals 7 and 8 to open.

The usefulness of this invention is optimized when storage capacitors C2 or C1 are allowed to charge, as described above, before the other storage capacitor, C1 or C2, is discharged.

The CONTROLLER senses, through voltage measuring circuit VMC1, when storage capacitor C1 has discharged to a programmed value. When this occurs, the CONTROLLER places the necessary voltage on output C and terminal 10 to turn off output transistor OT1.

Figure 7:
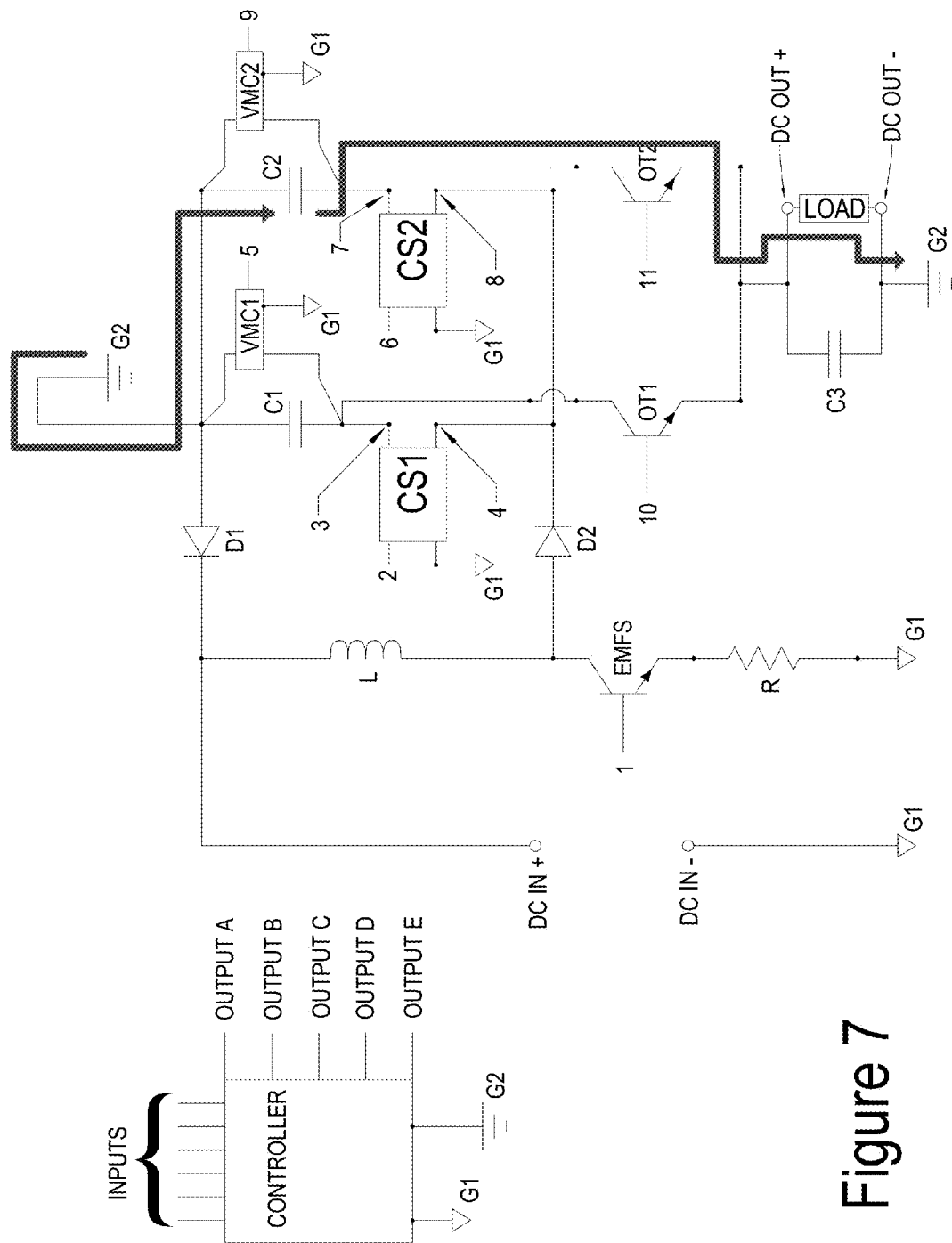
FIG. 7 is an electrical schematic of the system of the invention with an arrow showing the path of current when the second storage capacitor is providing power to the load.

After turning off output transistor OT1, the CONTROLLER places a programmed voltage, through output D, on terminal 11 to cause output transistor OT2 to place the same specific voltage on the DC OUT+ terminal as was done with output transistor OT1. The load connected to terminals DC OUT+ and DC OUT− causes current to flow from storage capacitor C2, through output transistor OT2, through terminal DC OUT+, through the load, through terminal DC OUT−, into ground G2, and back to storage capacitor C2 as shown in FIG. 7. This electric current flow causes storage capacitor C2 to continually lose electric charge and voltage in the same manner that storage capacitor C1 continually lost electric charge and voltage.

After output transistor OT1 was turned off and before output transistor OT2 was turned on, storage capacitor C3 would supply power to the load during this time so that the output voltage would remain nearly constant to minimize output voltage ripple.

Figure 4:
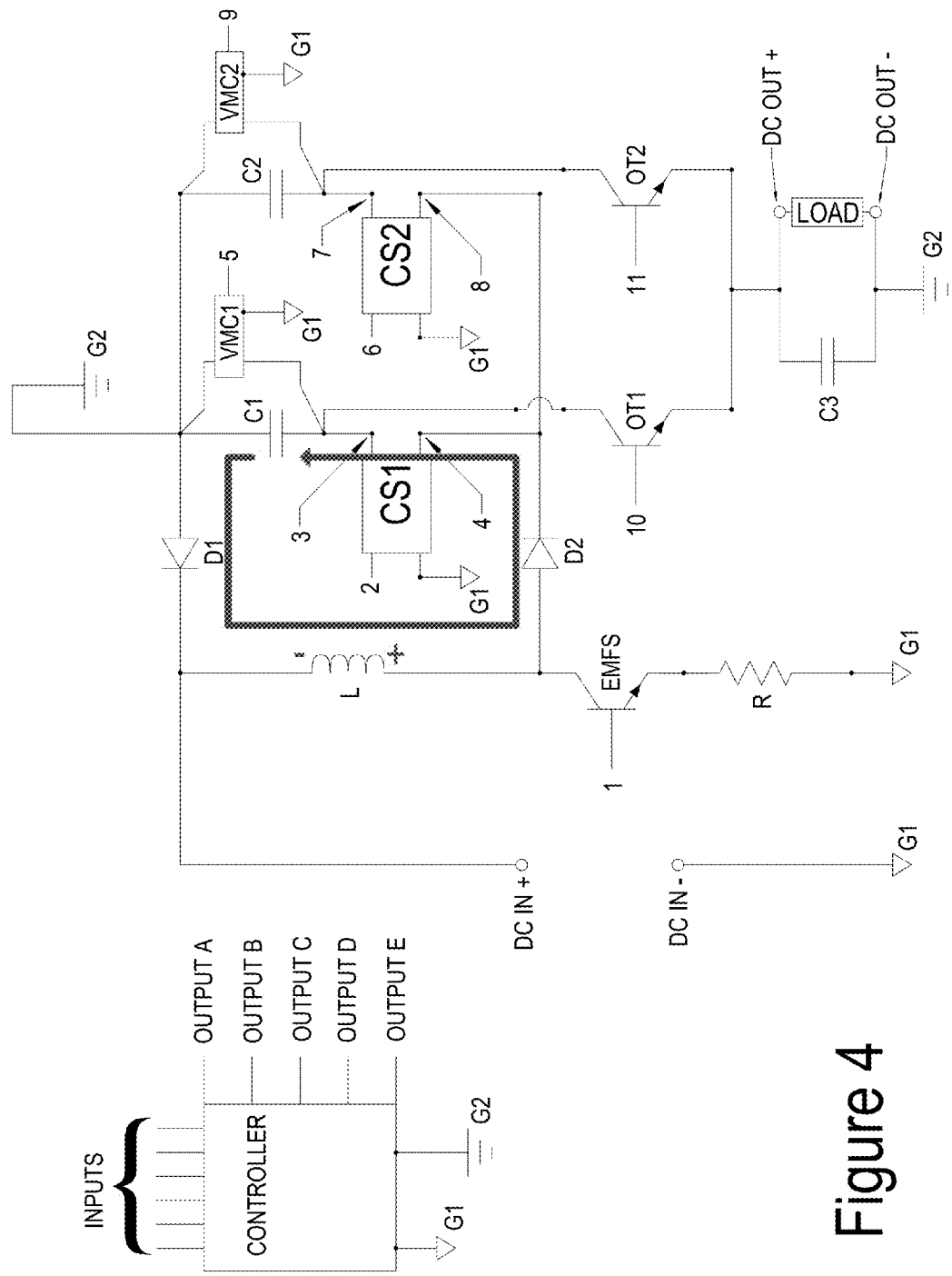
FIG. 4 is an electrical schematic of the system of the invention with an arrow showing the path of current when the inductor places electrical charge onto the first storage capacitor.

While storage capacitor C2 is providing electric power to the load through output transistor OT2, once again, output A from the CONTROLLER places control voltage on terminal 2 thereby closing the normally open output terminals 3 and 4 of charging switch CS1. Once again, output E is used by the CONTROLLER to place the same repeating voltage waveform on terminal 1 of emf switch EMFS as was described earlier shown by the arrows in FIG. 3 and FIG. 4. This causes storage capacitor C1 to be charged as in the same manner as previously described. Storage capacitor C1 is being charged, as shown in FIG. 3 and FIG. 4, at the same time storage capacitor C2 is supplying power to the LOAD, as shown in FIG. 7.

As previously explained, when the CONTROLLER senses that storage capacitor C1 has reached a programmed voltage, the CONTROLLER places the necessary voltage signal on output E to turn off emf switch EMFS. The CONTROLLER also removes the control voltage from terminal 2 on charging switch CS1 causing output terminals 3 and 4 to open.

The CONTROLLER senses, through voltage measuring circuit VMC2, when storage capacitor C2 is discharged to a programmed value. When this occurs, the CONTROLLER places the necessary voltage on output D and terminal 11 to turn off output transistor OT2.

After output transistor OT2 is turned off, the CONTROLLER places a programmed voltage, through output C, on terminal 10 to cause output transistor OT1 to place a specific voltage on the DC OUT+ terminal. Current flows through a LOAD connected to terminals DC OUT+ and DC OUT− in the same manner as previously described shown in FIG. 5.

After output transistor OT2 was turned off and before output transistor OT1 was turned on, capacitor C3 would again supply power to the load during this time so that the output voltage would remain nearly constant to minimize output voltage ripple.

While storage capacitor C1 is providing electric power to the load through output transistor OT1 as shown in FIG. 5, once again the CONTROLLER uses output B to place control voltage on terminal 6 thereby closing the normally open output terminals 7 and 8 of charging switch CS2. Once again, output E is used by the CONTROLLER to place the same repeating voltage waveform on terminal 1 of emf switch EMFS as was described earlier. This causes storage capacitor C2 to be charged as in the same manner as previously described by FIG. 3 and FIG. 6.

The charging and discharging of storage capacitors C1 and C2 continues to oscillate in the manner described to continually provide DC power to any LOAD connected to terminals DC OUT+ and DC OUT−.

At no time are the output terminals of CS1 closed while OT1 is on. At no time are the output terminals of CS2 closed while OT2 is on. At no time are the output terminals of CS1 and CS2 closed at the same time.

Figure 8:
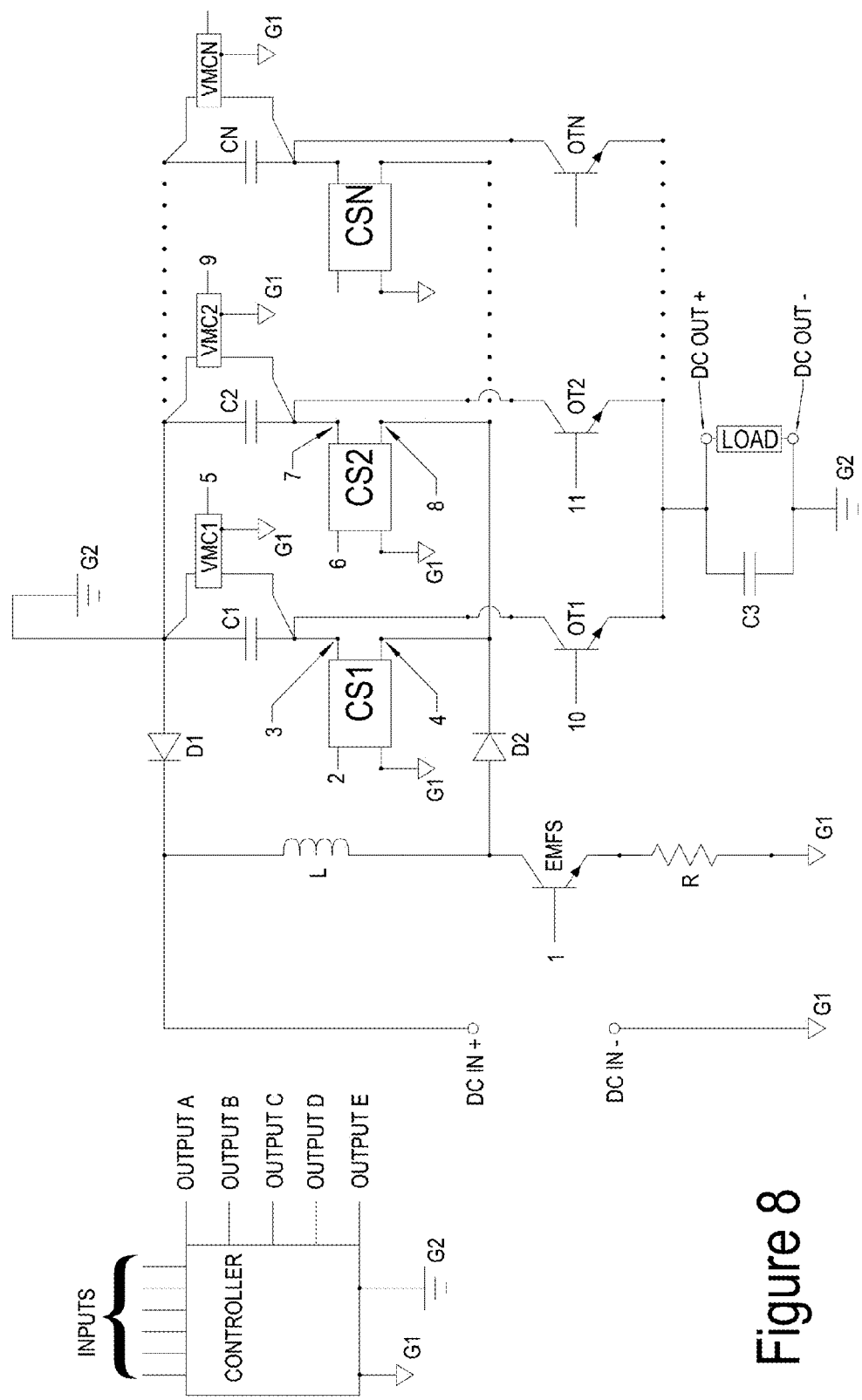
FIG. 8 is electrical schematic of the system showing an additional n number of storage capacitors in the system.

An additional storage capacitor or capacitors, that has/have the same function as 10 storage capacitors C1 and C2 may be added. Therefore, there may be C1, C2, through CN number of storage capacitors as shown in FIG. 8. Each additional storage capacitor will have the same circuit elements as storage capacitors C1 and C2, which will be connected to the CONTROLLER and the rest of the circuit in the same manner as the circuit elements associated with storage capacitors C1 and C2.

The outputs from the CONTROLLER may be used to quickly turn output transistors OT1, OT2, through OTN on and off while the storage capacitor C1, C2, through CN associated with each transistor is supplying power to a load connected to terminals DC OUT+ and DC OUT−. If this is done, the average current through the load will correspond to the average voltage between DC OUT+ and DC OUT−, and the discharge clock time of storage capacitors C1, C2, through CN will be increased.

The CONTROLLER is able to measure the rate of discharge of storage capacitors C1, C2, through CN and is able to signal the user and/or other devices when the rate of discharge exceeds any desired rate.

The CONTROLLER is powered by the DC voltage source connected to terminals DC IN+ and DC IN− or any other suitable source of power.

Depending on the desired circuit, grounds G1 and G2 may be electrically connected. Also, diodes D1 and D2 may both be used, or only one diode may be used. Diodes D1 and D2 provide circuit isolation for the storage capacitors and they prevent the storage capacitors from discharging while they are being charged.

From the foregoing description, one skilled in the art can easily ascertain the essential characteristics of this invention, and without departing from the spirit and scope thereof, can make various changes and modifications of the invention to adapt it to various usages and conditions.

Having thus generally described the invention, the same will become better understood from the claims in which it is set forth in a nonlimiting manner hereafter.

What is claimed is:

1. A direct current (DC) power source system comprising:
    a controller wherein said controller is configured to control the current flow and electric charge through the system;
    an electromotive force (emf) switch wherein said emf switch is configured to receive current from a DC voltage source and provide repeating and intermittent current to an inductor;
    the inductor wherein the inductor is configured to receive repeating and intermittent current from the emf switch and provide electric charge to at least two storage capacitors;
    the at least two storage capacitors configured to receive electric charge from the inductor and provide current to a load;
    at least two charging switches wherein said charging switches are provided between said at least two storage capacitors and said inductor, wherein said charging switches are connected to said controller and configured to be controlled by said controller and wherein said charging switches are configured to allow for the charging of said at least two storage capacitors, at least two output devices provided between said load and said at least two storage capacitors wherein said at least two output devices are connected to said controller and configured to being controlled by said controller, and wherein said at least two output devices are configured to allow the discharge of current from the at least two storage capacitors to said load; and at least one diode between the inductor and said at least two storage capacitors and in series with said at least two storage capacitors, wherein said inductor is in a parallel circuit with the at least two storage capacitors and wherein at least one diode is in series with said at least two storage capacitors, wherein said at least one diode is configured to provide circuit isolation for the at least two storage capacitors and prevent the at least two storage capacitors from discharging while they are being charged, wherein the system is configured to provide current from one of the at least two storage capacitors to a load while simultaneously charging at least one of the other at least two storage capacitors.

2. The system of claim 1 additionally comprising:
an output capacitor wherein the output capacitor is provided between the at least two output devices and the load and is configured in parallel with the load, and
wherein the output capacitor is configured to provide power to the load while the system switches between providing current from each of the at least two storage capacitors.

3. The system of claim 1 wherein
said at least two storage capacitors are charged to a voltage which is greater than the DC output voltage applied to the load.

4. The system of claim 1 additionally comprising:
voltage measuring circuits positioned across the terminals of the at least two storage capacitors, wherein said voltage measuring circuits are configured to measure voltage and communicate said voltage measurements to said controller.

5. The system of claim 1 wherein the storage capacitors, charging switches, and output devices of the system are associated with each other in a 1:1:1 ratio.

6. The system of claim 1 wherein only one of said charging switches is ever provided in a condition to allow its respective storage capacitor to charge.

7. The system of claim 1 wherein only one of said output devices is ever provided in a condition to allow its respective storage capacitor to discharge.

8. A method of providing power to a load comprising:
providing power to a load using the system of claim 1.

9. The system of claim 1 wherein the system is configured to switch from providing electrical current from one of the at least two storage capacitors to a load to providing electrical current from the other of the at least two storage capacitors to said load after said one of the at least two storage capacitors has been discharged to a predetermined value.

10. A method of providing power to a load comprising:
providing repeating and intermittent electrical current from a direct current (DC) voltage source to an inductor;
creating an inductive emf in said inductor;
charging a first storage capacitor with said inductor to a predetermined value;
providing electrical current from said first storage capacitor to said load while simultaneously charging at least one second storage capacitor; and
switching from providing electrical current from said first storage capacitor to providing electrical current from said at least one second storage capacitor after said first storage capacitor has been discharged to a predetermined value and after said at least one second storage capacitor has been charged to a predetermined value, simultaneously charging said first storage capacitor;
wherein the electrical current provided to a first storage capacitor is provided by an inductive emf where an emf switch repeatedly allows current from the DC voltage source to flow through an inductor and repeatedly and intermittently produces an inductive electromotive fore on the inductor of the same polarity of the DC voltage source, wherein the inductive emf force has a polarity and magnitude that causes an electric charge to be repeatedly placed on said first storage capacitor; and
wherein the inductor is in a parallel circuit with the first storage capacitor and said at least one second storage capacitor where at least one diode is in series with said at least two storage capacitors, wherein said at least one diode is configured to provide circuit isolation for the at least two storage capacitors and prevent the at least two storage capacitors from discharging while they are being charged.

11. The method of claim 10 wherein the system comprises more than two storage capacitors wherein a storage capacitor is charged only when another storage capacitor is being discharged and a previously discharged storage capacitor has already been charged to the predetermined value.

12. The method of claim 10 wherein while switching from providing electrical current from said first storage capacitor to providing electrical current from said at least one second storage capacitor or vice versa, an output capacitor provides electrical current to the load.

13. The method of claim 10 additionally comprising:
controlling the switching between storage capacitors by a controller.

14. The method of claim 10 additionally comprising:
providing circuit isolation for the first storage capacitor and the at least one second storage capacitor and preventing the first storage capacitor and the at least one second storage capacitor from discharging while they are being charged.

15. The method of claim 10 additionally comprising:
determining a voltage measurement on the first storage capacitor and the at least one second storage capacitor and
communicating said voltage measurements to a controller.

16. The method of claim 10 additionally comprising:
controlling the discharge of electrical current from said first storage capacitor and said at least one second storage capacitor to said load with at least two output devices.

17. The method of claim 10 wherein the predetermined value is a voltage that is higher than the DC output voltage.

18. The method of claim 10 wherein the system is configured to prevent the DC voltage source or the inductor from ever being in a current loop with the load.

* * * * *